United States Patent
Nakadate (10) Patent No.: US 7,596,477 B2
(45) Date of Patent: Sep. 29, 2009

(54) PEEL STRENGTH SIMULATING APPARATUS, PEEL STRENGTH SIMULATING PROGRAM STORAGE MEDIUM, AND PEEL STRENGTH SIMULATING METHOD

(75) Inventor: Mami Nakadate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 11/369,979

(22) Filed: Mar. 8, 2006

(65) Prior Publication Data

US 2007/0138652 A1    Jun. 21, 2007

(30) Foreign Application Priority Data

Dec. 19, 2005    (JP)    ............................. 2005-364434

(51) Int. Cl.
*G06F 17/50*    (2006.01)
*H01L 23/29*    (2006.01)

(52) U.S. Cl. ................................. 703/2; 703/7; 257/707; 257/782

(58) Field of Classification Search ...................... 703/2, 703/7; 257/678, 707, 782, 730
See application file for complete search history.

(56) References Cited

U.S. PATENT DOCUMENTS 5,959,363 A * 9/1999 Yamada et al. .............. 257/787
6,213,347 B1 * 4/2001 Thomas ....................... 222/52
6,617,683 B2 * 9/2003 Lebonheur et al. .......... 257/707
2001/0020736 A1 * 9/2001 Nakazawa et al. .......... 257/678

FOREIGN PATENT DOCUMENTS

| JP | 10-107182 | 4/1998 |
| JP | 2000-40775 | 2/2000 |
| JP | 2002-299547 | 10/2002 |

\* cited by examiner

*Primary Examiner*—Thai Phan
(74) *Attorney, Agent, or Firm*—Fujitsu Patent Center (57) ABSTRACT

The present invention provides a peel strength simulating apparatus which simulates peel strength between a semiconductor integrated circuit chip and a resin package bonded to each other. The apparatus includes a storage section which stores plural types of parameters. The apparatus also includes a parameter specifying section which specifies a changeable parameter whose numerical value is changeable from the plural types of parameters stored in the storage section and specifies change priorities when specifying plural types of changeable parameters. The apparatus further includes a simulating section which repeats simulation of the peel strength until the peel strength exceeding a predetermined threshold value is obtained while changing the numerical values of the specified changeable parameters according to the specified priorities.

4 Claims, 9 Drawing Sheets

PEEL STRENGTH SIMULATING APPARATUS, PEEL STRENGTH SIMULATING PROGRAM STORAGE MEDIUM, AND PEEL STRENGTH SIMULATING METHOD

BACKGROUND OF THE INVENTION

1. Field of the Invention

The present invention relates to a peel strength simulating apparatus for simulating peel strength between a semiconductor integrated circuit chip and a resin package which are bonded to each other, a peel strength simulating program storage medium in which a peel strength simulating program running on the peel strength simulating apparatus is stored, and a peel strength simulating method.

2. Description of the Related Art

Recently, as physical sizes of electronic instruments are reduced, physical sizes of semiconductor integrated circuit devices mounted on the electronic instruments are also reduced more and more. In such semiconductor integrated circuit devices, there is known a semiconductor integrated circuit device in which SCSP (Super Chip Size Package) having the size extremely close to the size of a semiconductor integrated circuit chip (silicon chip) is adopted. The SCSP type semiconductor integrated circuit device has a structure in which the semiconductor integrated circuit chip is exposed in a side face and a top surface of the semiconductor integrated circuit device while a resin package is formed below the semiconductor integrated circuit chip. When an excessive load due to temperature variation or a mechanical load is applied, sometimes there is generated a problem that the semiconductor integrated circuit chip and the resin package are peeled off each other at the boundary between the semiconductor integrated circuit chip and the resin package.

Therefore, conventionally, when the semiconductor integrated circuit device is mounted on the circuit board, the semiconductor integrated circuit chip and the resin package are fixed to each other by charging an under fill material between the resin package and the circuit board which are formed below the semiconductor integrated circuit chip, or the resin package is fixed by making a U-shaped groove in a lower surface of the semiconductor integrated circuit chip.

Japanese Patent Application Laid-Open (JP-A) No. 2000-40775 proposes a technique in which the peel generated at the boundary between the semiconductor integrated circuit chip and the resin package is prevented by providing a side-face coating portion for coating a part of outer peripheral side-face of the semiconductor integrated circuit chip in the resin package for sealing the circuit formed surface of the semiconductor integrated circuit chip.

JP-A No. 10-107182 proposes a technique in which a crack generated in the resin package by thermal stress is prevented by electrically connecting an electrode formed on the circuit board and the semiconductor integrated chip with a solder bump to regulate a size of a peripheral portion of sealing resin charged into a gap between the board and the semiconductor integrated circuit chip.

JP-A No. 2002-299547 proposes a technique in which the crack generated in the resin package by thermal stress is prevented by forming a tapered surface peripheral portion of one of first and second semiconductor integrated circuit chips having a larger contact area with the resin package, in the semiconductor integrated circuit device in which the outer peripheral portions of the first and second semiconductor integrated circuit chips mounted on the board in a laminated, manner is sealed by the resin package.

Thus, conventionally, the resin package and the circuit board are fixed by the under fill material in order to prevent the peel generated at the boundary between the semiconductor integrated circuit chip and the resin package. In this case, when the under fill material is not sufficiently charged, there is a fear that the peel is generated at the boundary between the semiconductor integrated circuit chip and the resin package after a reflow process, so that it is necessary to sufficiently manage a process of charging the under fill material. This causes a problem that production cost is increased. For the case where the U-shaped groove is made in the lower surface of the semiconductor integrated circuit chip, when the U-shaped groove made is not large enough, there is the fear that the peel is generated at the boundary between the semiconductor integrated circuit chip and the resin package, so that it is necessary to sufficiently manage a process of making the size of the under fill material. This also causes the problem that the production cost is increased.

Therefore, it is conceivable to employ the techniques proposed in JP-A Nos. 2000-40775, 10-107182, and 2002-299547are adopted. However, because the techniques proposed in JP-A Nos. 2000-40775, 10-107182, and 2002-299547 are a technique concerning a structure of the semiconductor integrated circuit device, the adoption of the techniques proposed in JP-A Nos. 2000-40775, 10-107182, and 2002-299547 requires the semiconductor integrated circuit device having the structure in which various conditions are considered to prevent the peel generated at the boundary between the semiconductor integrated circuit chip and the resin package. Accordingly, there is the problem that the cost is increased in the semiconductor integrated circuit device.

SUMMARY OF THE INVENTION

The present invention has been made in view of the above circumstances and provides a peel strength simulating apparatus, a peel strength simulating program storage medium, and a peel strength simulating method in which the highly-reliable semiconductor integrated circuit device can be obtained by sufficiently enhancing peel strength between the semiconductor integrated circuit chip and resin package bonded to each other while the cost increase is suppressed.

A peel strength simulating apparatus according to the invention simulates peel strength between a semiconductor integrated circuit chip and a resin package bonded to each other, the peel strength simulating apparatus including:

a storage section which stores a parameter table where plural types of parameters are each associated with a changeable numerical range of a parameter or a group of numerical values of a parameter in the parameter table;

a parameter specifying section which specifies a changeable parameter whose numerical value is changeable from the plural types of parameters in the parameter table stored in the storage section, the parameter specifying section specifying change priorities when specifying plural types of changeable parameters; and a simulating section which repeats simulation of the peel strength until the peel strength exceeding a predetermined threshold value is obtained while changing the numerical values of the changeable parameters specified by the parameter specifying section according to the priorities specified by the parameter specifying section.

In the semiconductor integrated circuit device having the structure in which the resin package is formed below the semiconductor integrated circuit chip, in order to prevent the trouble that the peel is generated at the boundary between the semiconductor integrated circuit chip and the resin package while the cost increase is suppressed, it is necessary to sufficiently consider a size, a material, a production condition, a usage condition, and the like of each of constituent elements of the semiconductor integrated circuit device from a design stage of the semiconductor integrated circuit device.

The peel strength simulating apparatus of the invention is an apparatus in which the changeable conditions (numerical values), changeable conditions (group of numerical values), and the change priorities are specified, and the simulating section repeats the simulation of the peel strength until the peel strength exceeding the predetermined threshold value is obtained while simulating section changes the specified conditions according to the specified priorities. Therefore, the peel strength simulating apparatus of the invention can provide the semiconductor integrated circuit device having the peel strength matching the production condition and the usage condition of the semiconductor integrated circuit device between the semiconductor integrated circuit chip and the resin package, which allows the cost increase to be suppressed.

It is preferable that the parameter table stored in the storage section includes at least a numerical range of a changeable size and a physical property of a changeable material.

When the above parameter table is stored in the storage section, typically the simulation can be repeated to obtain the peel strength exceeding the predetermined threshold value while height sizes of the semiconductor integrated circuit chip and resin package, a dicing angle of the semiconductor integrated circuit chip, and the like are changed according to the priorities, and while the physical properties such as a Young's modulus and a Poisson ratio which are of the group of numerical values of the resin package material are referred to.

The invention also provides a peel strength simulating program storage medium which stores a peel strength simulating program that causes, when executed in an information processing apparatus, the information processing apparatus to operate as a peel strength simulating apparatus that simulates peel strength between a semiconductor integrated circuit chip and a resin package bonded to each other, the peel strength simulating apparatus including:

a storage section which stores a parameter table where plural types of parameters are each associated with a changeable numerical range of a parameter or a group of numerical values of a parameter in the parameter table;

a parameter specifying section which specifies a changeable parameter whose numerical value is changeable from the plural types of parameters in the parameter table stored in the storage section, the parameter specifying section specifying change priorities when specifying plural types of changeable parameters; and a simulating section which repeats simulation of the peel strength until the peel strength exceeding a predetermined threshold value is obtained while changing the numerical values of the changeable parameters specified by the parameter specifying section according to the priorities specified by the parameter specifying section.

The peel strength simulating program storage medium of the invention is executed in the peel strength simulating apparatus which simulates the peel strength between the semiconductor integrated circuit chip and the resin package bonded to each other. Therefore, the peel strength simulating program storage medium of the invention can provide the highly-reliable semiconductor integrated circuit device in which the peel strength between the semiconductor integrated circuit chip and the resin package bonded to each other is sufficiently enhanced while the cost increase is suppressed.

The invention also provides a peel strength simulating method of simulating peel strength between a semiconductor integrated circuit chip and a resin package bonded to each other, the peel strength simulating method including:

preparing a parameter table where plural types of parameters are each associated with a changeable numerical range of a parameter or a group of numerical values of a parameter in the parameter table;

specifying a changeable parameter whose numerical value is changeable from the plural types of parameters in the parameter table stored in the storage section and specifying change priorities when specifying plural types of changeable parameters; and repeating simulation of the peel strength until the peel strength exceeding a predetermined threshold value is obtained while changing the numerical values of the changeable parameters specified by the parameter specifying section according to the priorities specified by the parameter specifying section.

The peel strength simulating method of the invention is a method in which the changeable conditions (numerical values), changeable conditions (group of numerical values), and the change priorities are specified, and the simulation of the peel strength is repeated until the peel strength exceeding the predetermined threshold value is obtained while the specified conditions are changed according to the specified priorities. Therefore, in producing the semiconductor integrated circuit device, the semiconductor integrated circuit device having the peel strength matching the production condition and the usage condition of the semiconductor integrated circuit device between the semiconductor integrated circuit chip and the resin package can be produced while the cost increase is suppressed.

Accordingly, the present invention can provide a peel strength simulating apparatus, a peel strength simulating program, and a peel strength simulating method in which the highly-reliable semiconductor integrated circuit device can be obtained by sufficiently enhancing peel strength between the semiconductor integrated circuit chip and resin package bonded to each other while the cost increase is suppressed.

DETAILED DESCRIPTION OF THE INVENTION

Preferred embodiments of the invention will be described below.

Figure 1:
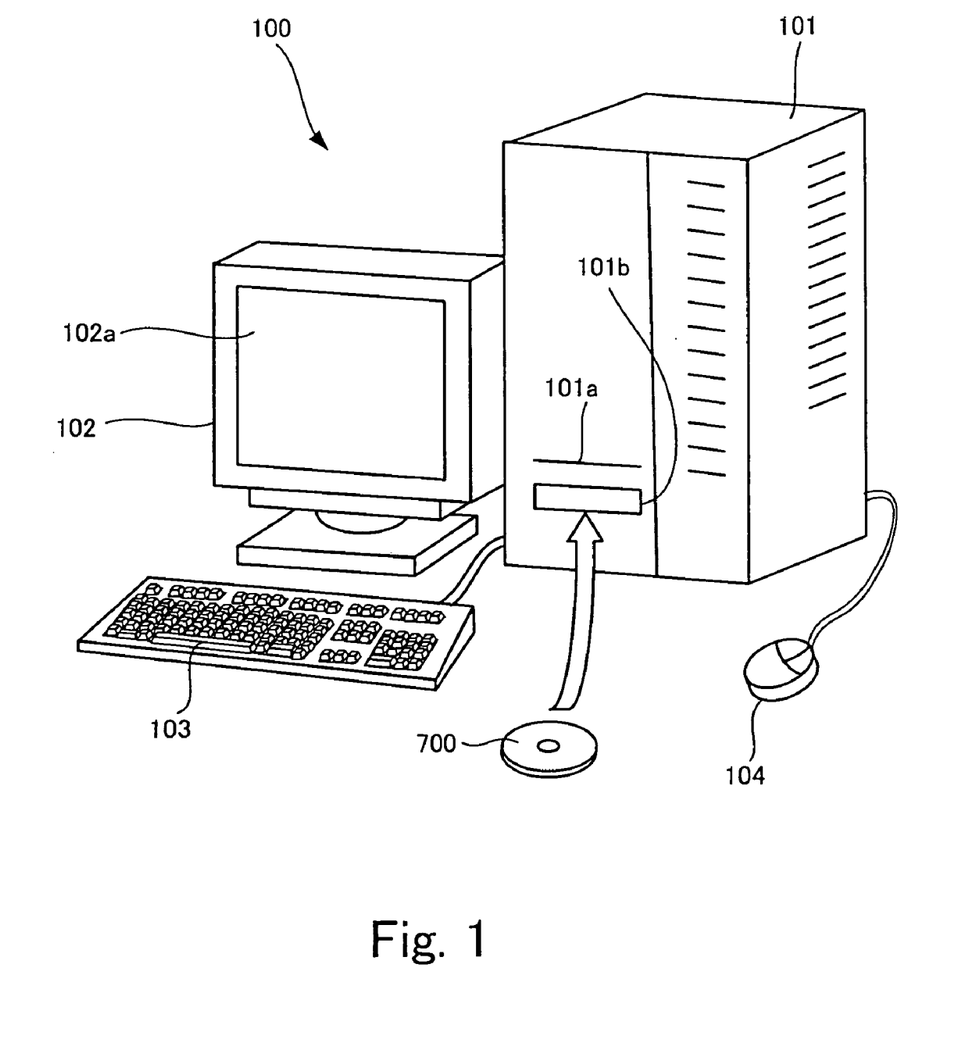
FIG. 1 is a schematic view showing an information processing apparatus in which a peel strength simulating apparatus according to an embodiment of the invention is realized.

FIG. 1 is a schematic view showing an information processing apparatus in which a peel strength simulating apparatus according to an embodiment of the invention is realized.

FIG. 1 shows a computer 100 generally called a workstation or a personal computer which is of the information processing apparatus, and the computer 100 realizes a peel strength simulating apparatus according to the embodiment of the invention. A peel strength simulating method according to an embodiment of the invention is applied to the peel strength simulating apparatus of the embodiment. A hardware configuration of the computer 100 will be described.

The computer 100 includes a main body section 101, a display section 102, a keyboard 103, and a mouse 104. CPU (Central Processing Unit), RAM (Random Access Memory), a hard disk, a communication board, and the like are incorporated in the main body section 101. The display section 102 displays an image and characters on a display screen 102a according to an instruction from the main body section 101. The keyboard 103 is used to input an instruction of a user to the computer 100. The mouse 104 is used to input an instruction corresponding to an icon or the like by specifying the icon displayed at an arbitrary position on the display screen 102a.

In an appearance of the main body section 101, the main body section 101 has a flexible disk loading aperture 101a and a CD-ROM loading aperture 101b into which a flexible disk (not shown) and CD-ROM 700 are loaded respectively. A flexible disk drive and a CD-ROM drive, which drive and have access to the flexible disk drive and CD-ROM 700 loaded from the loading apertures 101a and 101b, are incorporated in the flexible disk loading aperture 101a and the CD-ROM loading aperture 101b.

Figure 2:
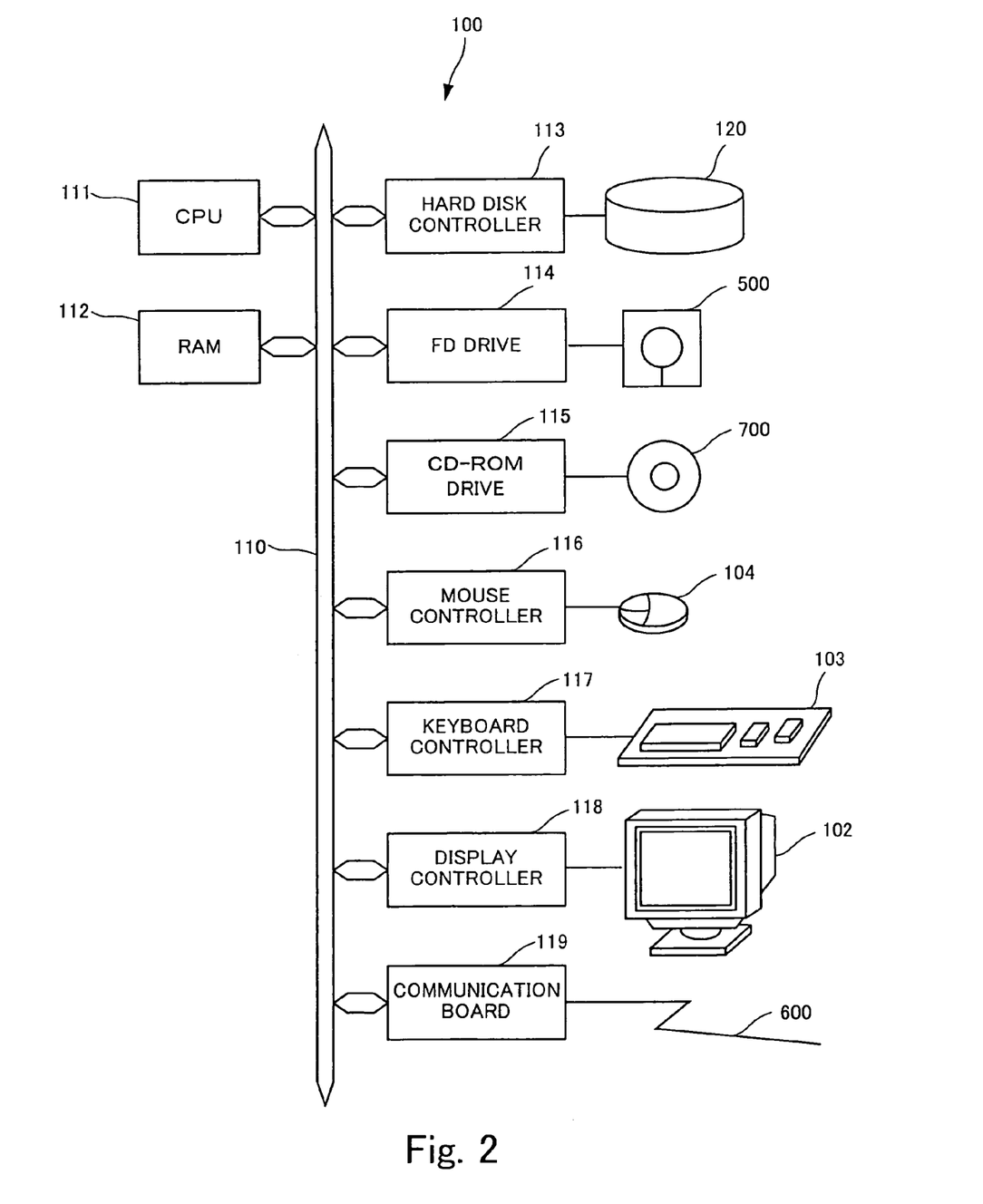
FIG. 2 shows a hardware block diagram of a computer having an appearance shown in FIG. 1.

FIG. 2 shows a hardware block diagram of the computer 100 having the appearance shown in FIG. 1.

Referring to FIG. 2 of the hardware block diagram, the computer 100 includes CPU 111, RAM 112, a hard disk controller 113, a flexible disk drive 114, a CD-ROM drive 115, a mouse controller 116, a keyboard controller 117, a display controller 118, and a communication board 119. The devices shown in FIG. 2 are connected to one another with a bus 110.

As explained in FIG. 1, the flexible disk drive 114 and the CD-ROM drive 115 have access to a flexible disk 500 and CD-ROM 700 loaded from the flexible disk loading aperture 101a and the CD-ROM loading aperture 101b respectively. The communication board 119 is connected to a communication line 600.

The computer 100 also includes a hard disk 120, a mouse 104, a keyboard 103, and a display section 102 (CRT display) The hard disk controller 113 can have access to the hard disk 120, the mouse controller 116 controls the mouse 104, the keyboard controller 117 controls the keyboard 103, and the display controller 118 controls the display section 102.

Figure 3:
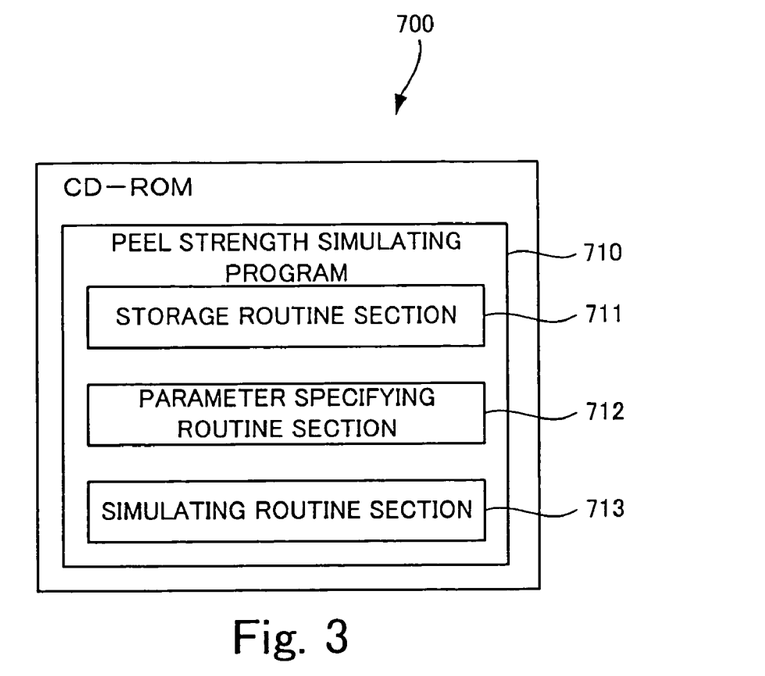
FIG. 3 is a conceptual view showing CD-ROM which is of a peel strength simulating program storage medium according to an embodiment of the invention, in which a peel strength simulating program running on the information processing apparatus of FIG. 1 is stored.

FIG. 3 is a conceptual view showing CD-ROM which is of a peel strength simulating program storage medium according to an embodiment of the invention, in which a peel strength simulating program running on the computer 100 is stored.

A peel strength simulating program 710 is stored in CD-ROM 700 shown in FIG. 3. The peel strength simulating program 710 includes a storage routine section 711, a parameter specifying routine section 712, and a simulating routine section 713. These sections of the peel strength simulating program 710 will be described in detail along with operations of the sections in the peel strength simulating apparatus according to the embodiment of the invention.

Figure 4:
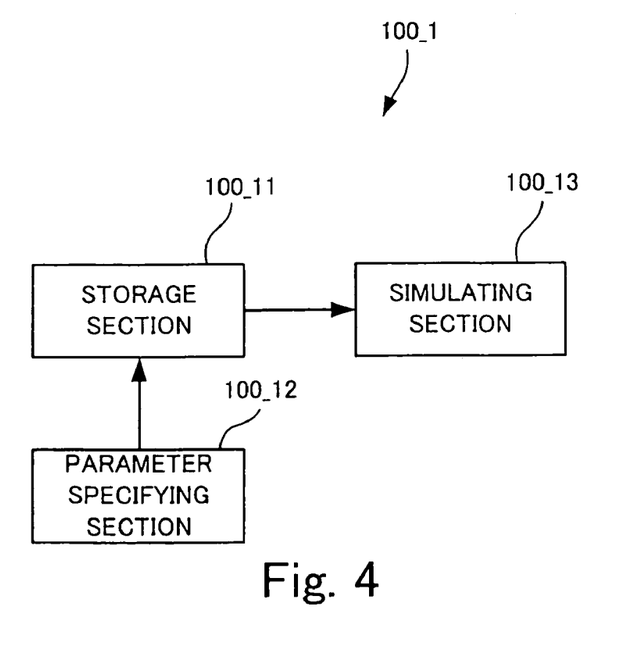
FIG. 4 shows a peel strength simulating apparatus according to an embodiment of the invention.

FIG. 4 shows a peel strength simulating apparatus according to an embodiment of the invention.

Referring to FIG. 4, a peel strength simulating apparatus 100_1 includes a storage section 100_11, a parameter specifying section 100_12, and a simulating section 100_13.

The storage section 100_11 is operated by executing the program of the storage routine section 711 shown in FIG. 3, and a parameter table is stored in the storage section 100_11. In the parameter table, each parameter type is associated with a numerical range where each parameter can be changed or a group of numerical values. Specifically a part of an area of the hard disk 120 shown in FIG. 2 is allocated to the storage section 100_11. The parameter table will be described later.

The parameter specifying section 100_12 is operated by executing the program of the parameter specifying routine section 712 shown in FIG. 3. The parameter specifying section 100_12 specifies a changeable parameter in which the numerical value can be changed among plural kinds of parameters listed in the parameter table stored in the storage section 100_11. The parameter specifying section 100_12 also specifies change priorities when the plural kinds of the changeable parameters are specified. Specifically, the keyboard 103 and the mouse 104 shown in FIGS. 1 and 2 serve as the parameter specifying section 100_12. The keyboard 103 and the mouse 104 specify the changeable parameter shown in the parameter table displayed on the display screen 102a, and the keyboard 103 and the mouse 104 specify the change priorities when the plural kinds of the changeable parameters are specified.

The simulating section 100_13 is operated by executing the program of the simulating routine section 713 shown in FIG. 3. The simulating section 100_13 repeats the simulation of the peel strength while changing the numerical values of the changeable parameter, specified by the parameter specifying section 100_12, according to the priorities specified by the parameter specifying section 100_12 until the peel strength exceeding a predetermined threshold value is obtained. Specifically, CPU 111 shown in FIG. 2 executes the program of the simulating routine section 713, stored in the hard disk 120, to operate the simulating section 100_13.

Figure 5:
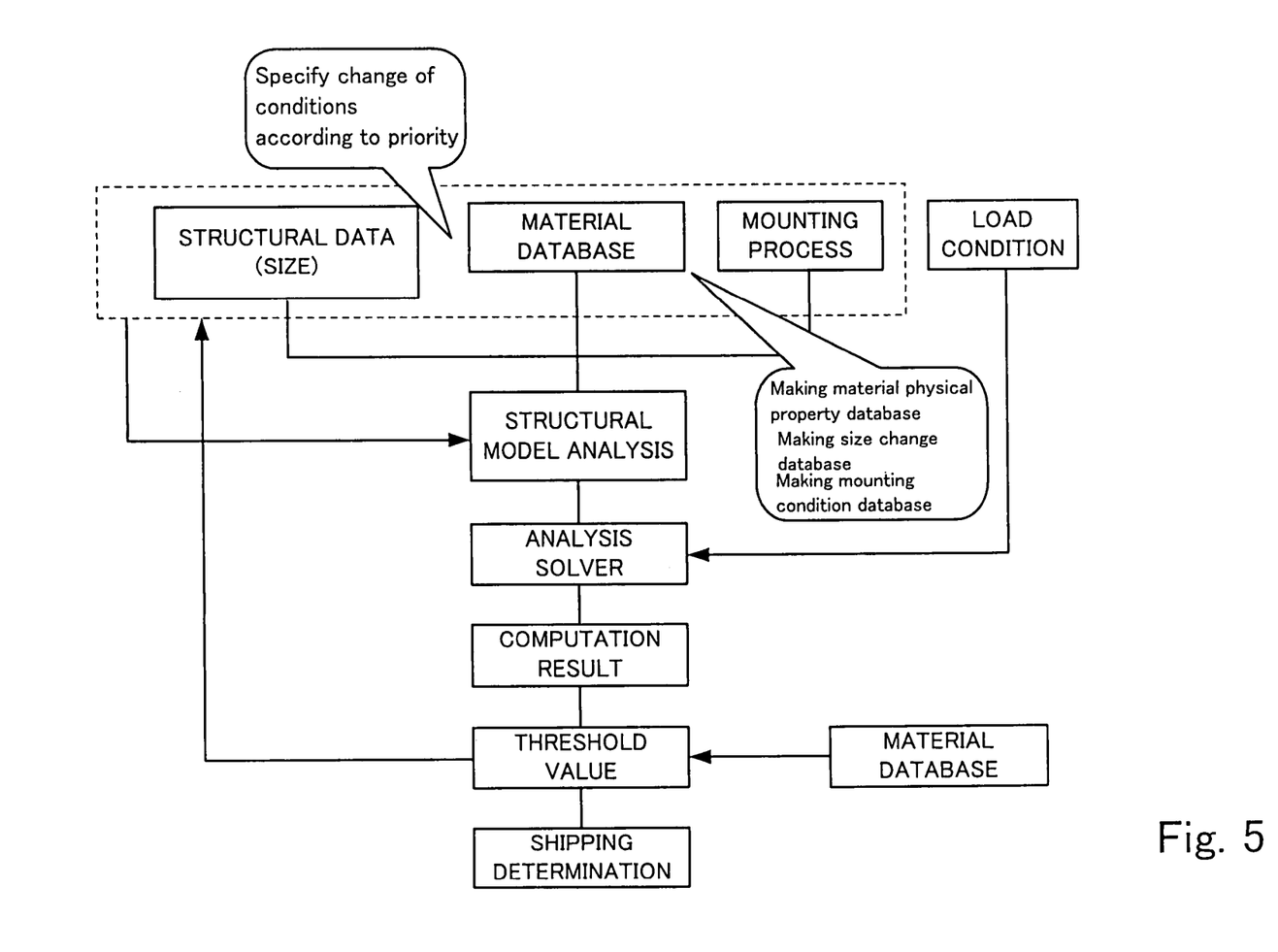
FIG. 5 shows a schematic flow executed by the peel strength simulating apparatus shown in FIG. 4.
Figure 6:
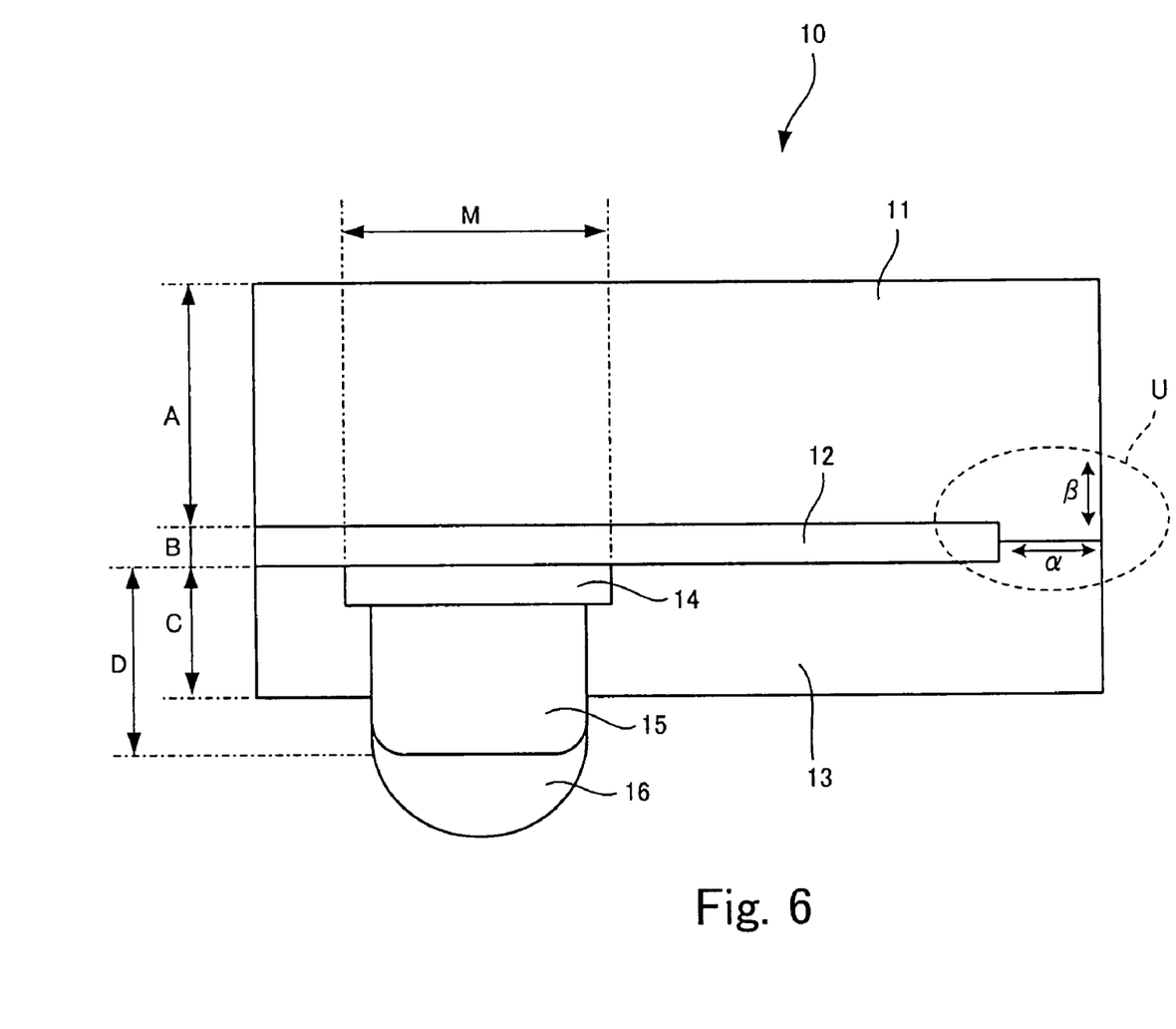
FIG. 6 shows a model of a semiconductor integrated circuit device produced by the peel strength simulating apparatus shown in FIG. 4.

FIG. 5 shows a schematic flow executed by the peel strength simulating apparatus shown in FIG. 4, and FIG. 6 shows a model of a semiconductor integrated circuit device produced by the peel strength simulating apparatus shown in FIG. 4.

The peel strength simulating apparatus 100_1 shown in FIG. 4 produces the model of the semiconductor integrated circuit device shown in FIG. 6 in advance of the execution of the flow shown in FIG. 5.

FIG. 6 shows a sectional view of the model (hereinafter the model is referred to as semiconductor integrated circuit device 10 for the sake of convenience) of the semiconductor integrated circuit device produced by the peel strength simulating apparatus 100_1. The simulation is performed to the constituent elements of the semiconductor integrated circuit device 10 by applying the parameter table and the like stored in the storage section 100_11, which allows the high-reliable semiconductor integrated circuit device to be provided while the structure (size), the material, the production condition, the usage conditions, and the like are sufficiently considered. The parameter table will be described below. Table 1 shows the parameter table in which each parameter type is associated with a changeable numerical range of the parameter. Table 2 shows the parameter table in which each parameter type is associated with a group of numerical values of the parameter.

TABLE 1

(unit: μm)

| | Variable | Current size | Changeable range |
|---|---|---|---|
| Silicon height | A | 500 | 400-600 |
| PI height | B | 10 | 5-20 |
| Resin height | C | 60 | 30-100 |
| Cu height | D | 250 | 220-270 |
| Wiring | M | 200 | 180-220 |
| U-shaped groove width | α | 0.02 | 0.01-0.05 |
| U-shaped groove height | β | 0.03 | 0.015-0.1 |
| Dicing angle | θ | 0 | 0-5 |

TABLE 2

| | Young's modulus | Poisson ratio | Coefficient liner expansion |
|---|---|---|---|
| Solder material | 47.6 | 0.35 | $20.8 \times 10^{-6}$ |
| PI material | 2.8 | 0.3 | $50 \times 10^{-6}$ |
| Resin material | 11.7 | 0.33 | $12 \times 10^{-6}$ |
| UF material | 3.1 | 0.37 | $\alpha1: 88 \times 10^{-6}\ \alpha2: 205 \times 10^{-6}$ |

Table 1 shows the numerical range of changeable size for each constituent element of the semiconductor integrated circuit device 10. Table 2 shows changeable physical properties of the materials for each constituent element of the semiconductor integrated circuit device 10.

Referring to FIG. 6, the semiconductor integrated circuit device 10 has a semiconductor integrated circuit chip (silicon chip) 11, a PI (polyimide) section 12, an epoxy resin section 13, a wiring section 14, a Cu (copper) post section 15, a solder bump section 16, and a section U. The PI section 12 is formed on the lower surface of the semiconductor integrated circuit chip 11 to protect the lower surface. The epoxy resin section 13 seals the lower portion of the semiconductor integrated circuit chip 11 where the PI section 12 is formed. A signal is transmitted through the wiring section 14. The Cu post section 15 is connected to the wiring section 14. The solder bump section 16 is provided in the Cu post section 15. The later-mentioned U-shaped groove 17 is formed in the section U.

As shown in Table 1, a variable A which is of the parameter for changing the size in a height direction is allocated to the semiconductor integrated circuit chip 11. Variables B and C which are of the parameter for changing the size in the height direction are allocated to the PI section 12 and the epoxy resin section 13 respectively. A variable M which is of the parameter for changing the size in a width direction is allocated to the wiring section 14. A variable D which is of the parameter for changing the size in the height direction is allocated to the Cu post section 15. Variables α and β are allocated to the section U. The variables α and β change the sizes in the width direction and in the height direction which regulate the U-shaped groove 17.

A variable θ which is of the parameter for changing a dicing angle of the semiconductor integrated circuit chip 11 is shown in Table 1 in addition to the variables A, B, C, D, M, α, and β. Table 1 shows the sizes currently set as the variables A, B, C, D, M, α, β, and θ and the changeable range of the variables A, B, C, D, M, α, β, and θ. On the other hand, Table 2 shows a Young's modulus, a Poisson ratio, and a coefficient of linear expansion. The Young's modulus, the Poisson ratio, and the coefficient of linear expansion are each of the variable parameters (physical properties) of a solder material, a PI material, a resin material, and a UF material. The solder material, the PI material, the resin material, and the UF material are materials of the solder bump section 16, the PI section 12, the epoxy resin section 13, and an under fill section 1 (described later) respectively.

A schematic flow performed by the peel strength simulating apparatus of the embodiment will be described below with reference to FIG. 5. The peel strength simulating apparatus changes the structural data (sizes) shown in Table 1, the material database shown in Table 2, and a mounting process (mounting condition) to the constituent elements of the semiconductor integrated circuit device 10 according to the specified priorities. Then, the peel strength simulating apparatus analyzes the structural model (semiconductor integrated circuit device 10) on the changed conditions, and the peel strength simulating apparatus performs the computation with an analysis solver in consideration of load conditions such as heat, bending, and drop. The computation result is compared to a threshold value (for example, resin bending strength) determined by referring to the material database.

As a result of the comparison, when it is determined that the computation result is larger than the threshold value, the structural data (sizes), the material database, and the mounting process are changed. Then, as described above, the structural model is analyzed, and the computation is performed with the analysis silver. When it is finally determined that the computation result is smaller than the threshold value, it is determined that the semiconductor integrated circuit device 10 can be shipped.

Figure 7:
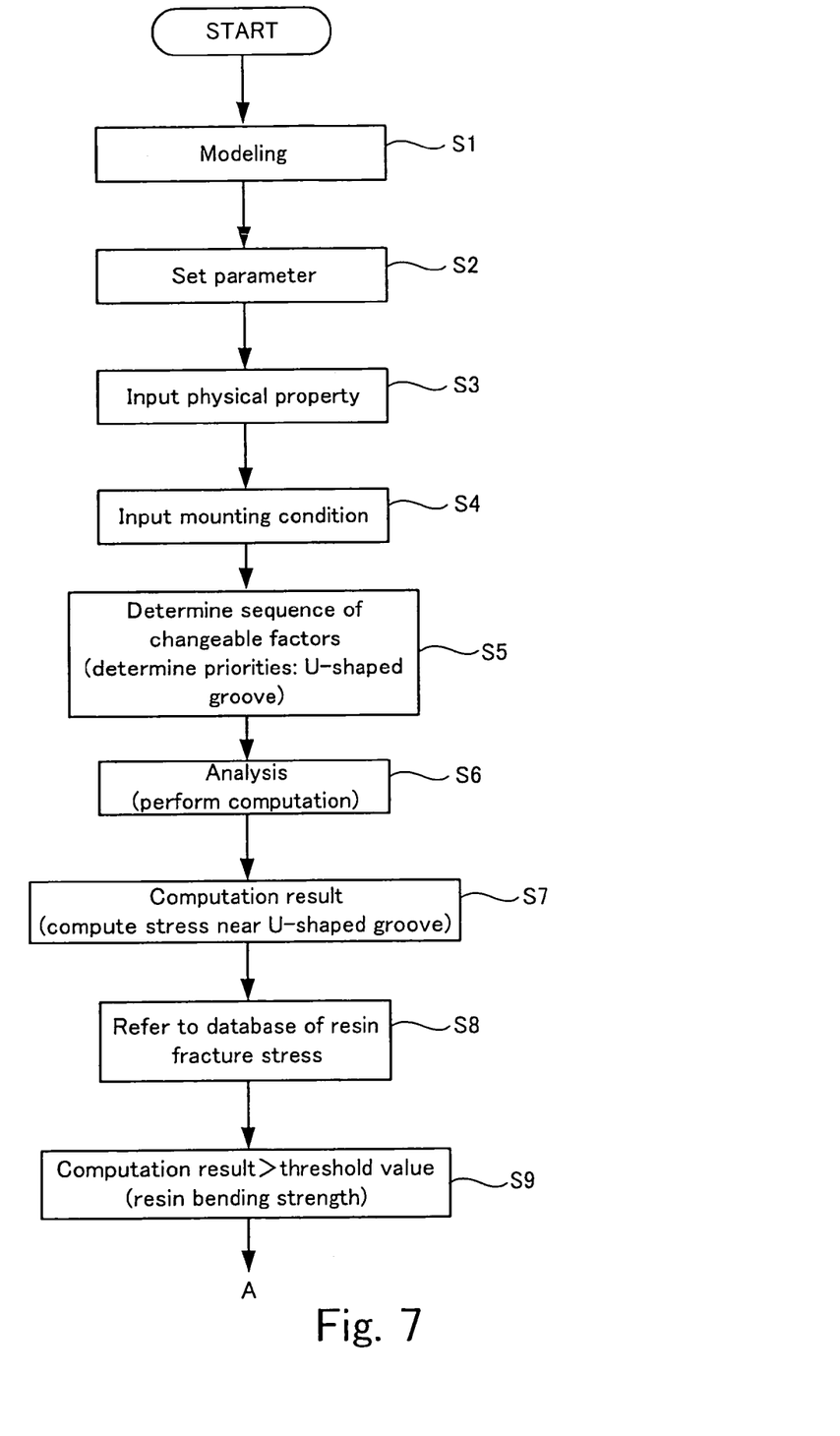
FIG. 7 shows a first half of detailed flow executed by the peel strength simulating apparatus shown in FIG. 4.
Figure 8:
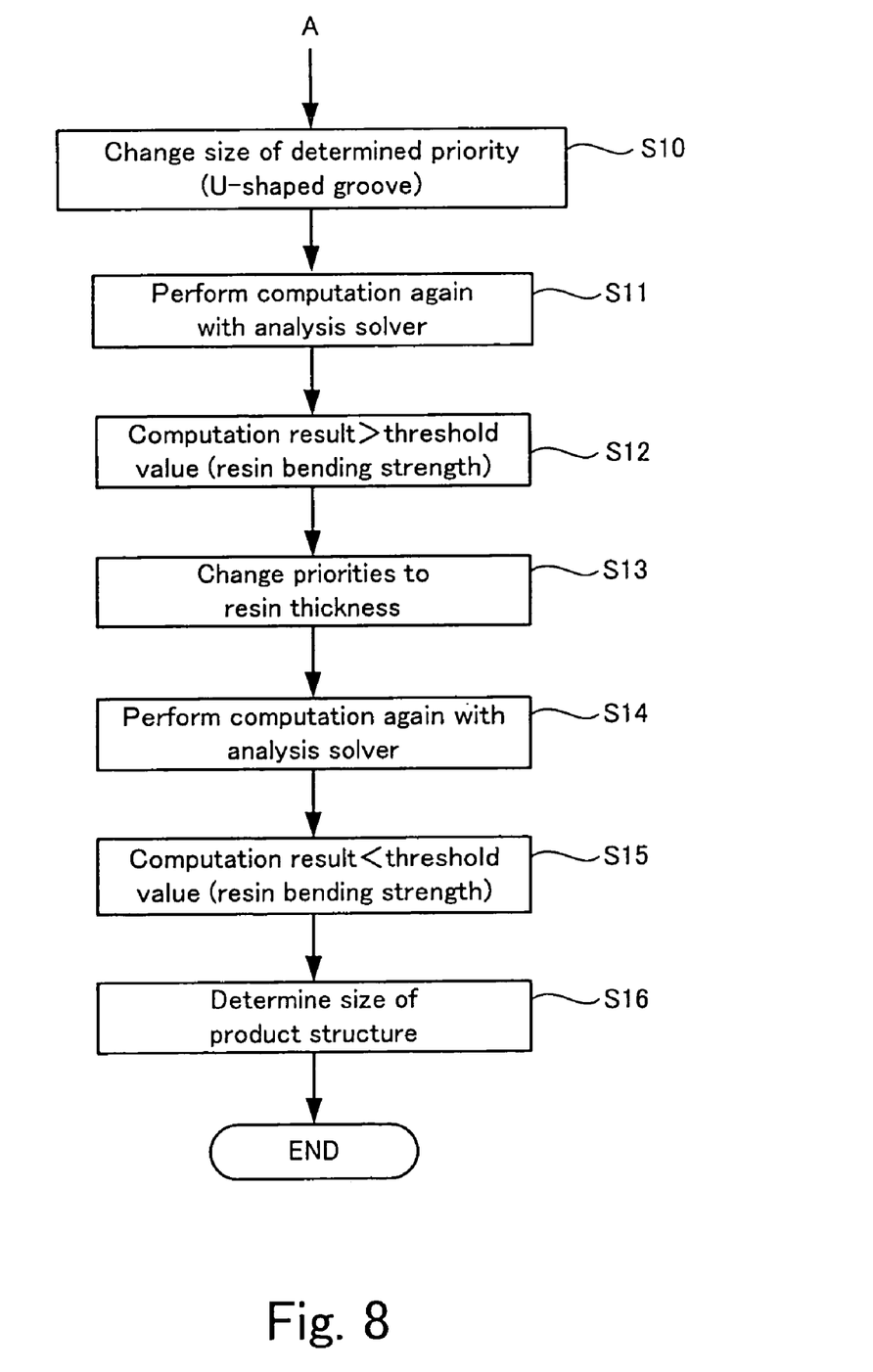
FIG. 8 shows a second half subsequent to the first half of detailed flow shown in FIG. 7.

FIG. 7 shows a first half of detailed flow executed by the peel strength simulating apparatus shown in FIG. 4, and FIG. 8 shows a second half subsequent to the first half of detailed flow shown in FIG. 7.

As shown in FIG. 6, the modeling of the semiconductor integrated circuit device is performed in step S1. The parameters (sizes) shown in Table 1 are set in step 2. The physical properties shown in Table 2 are inputted in step S3.

The mounting conditions are inputted in step S4 (the database of the mounting conditions is made beforehand and the mounting conditions are selected from the database). The following mounting conditions can be employed by way of example.

25° C.→soldering at 220° C.→charging UF material at 25° C.→curing UF material at 150° C.→25° C.→performing temperature cycle test in range of −40° C. to 125° C.

The sequence of changeable factors is determined in step S5 (priorities are determined). In this case, the first priority is assigned to the sizes α and β of the U-shaped groove, the second priority is assigned to the resin thickness C, and the third priority is assigned to the UF material.

The analysis (performing the computation) is performed in step S6. In step S7, a stress (principal stress) near the U-shaped groove is determined as a result of the computation. In this case, for example, an average of integration points of five elements in the resin section is computed to determine the computation result of 30 MPa.

A fracture stress of the resin is referred to from the material database in step S8. For example, the resin bending strength of 25 MPa is referred to. --In step S9, it is determined that the threshold value (resin bending strength) is smaller than the computation result. Then, the sizes $\alpha$ and $\beta$ of the U-shaped groove having the first priority are changed in step S10 shown in FIG. 8. Here, the sizes $\alpha$ and $\beta$ of the U-shaped groove are changed to two cases of (1) $\alpha$:0.04 and $\beta$: 0.06 and (2) $\alpha$:0.05 and $\beta$:0.09.

The computation is performed again with the analysis solver in step S11, and the flow goes to step S12. In the step S12, it is determined that the threshold value (resin bending strength) is smaller than the computation result in the two cases. Then, the priorities are changed to the resin thickness in step S13. In this case, the resin thickness is changed to two cases of (1) C: 40 µM and (2) C: 80µM.

The computation is performed again with the analysis solver in step S14, and the flow goes to step S15. In the step S15, in the case of (2) C: 80 µm, it is determined that the computation result is smaller than the threshold value (resin bending strength). Then, in step S16, it is determined that the size of the product structure is determined, and the flow is ended.

Figure 9:
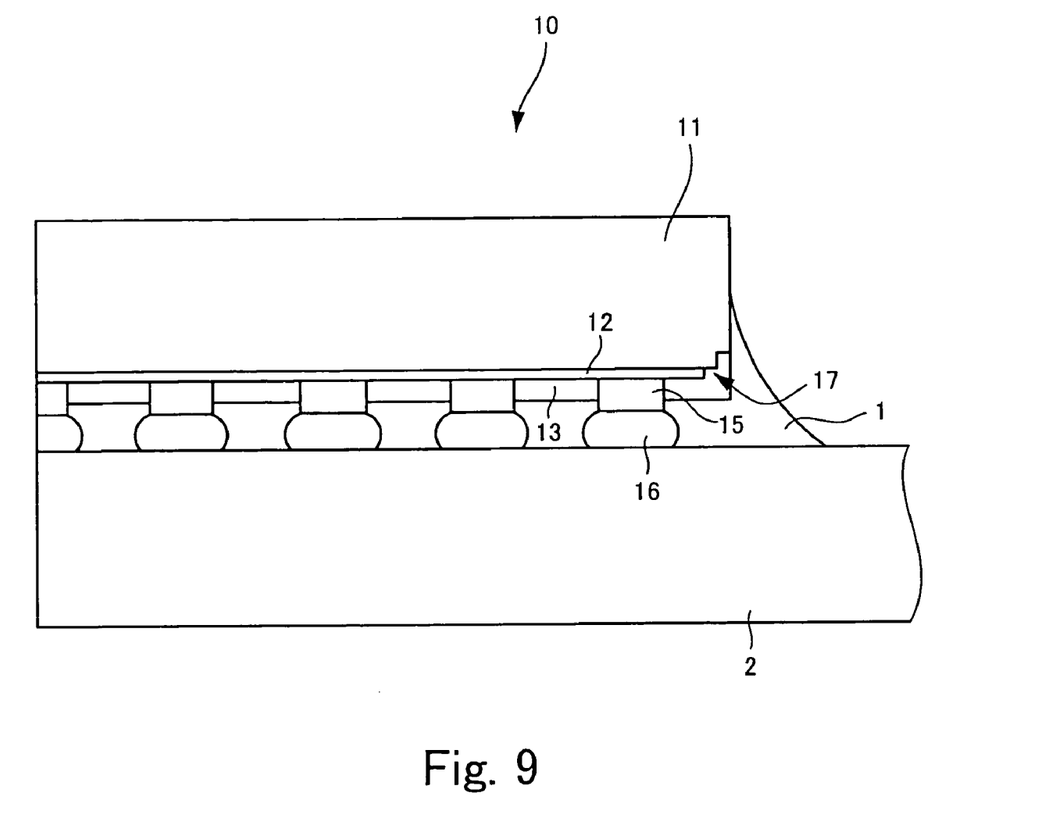
FIG. 9 shows a state in which the semiconductor integrated circuit device whose product sizes are determined by the flow shown in FIGS. 7 and 8 is mounted on a circuit board by an under fill material.

FIG. 9 shows a state in which the semiconductor integrated circuit device whose product dimensions are determined by the flow shown in FIGS. 7 and 8 is mounted on a circuit board by an under fill material.

FIG. 9 shows the semiconductor integrated circuit device 10 whose product sizes are determined. The semiconductor integrated circuit device 10 has the U-shaped groove 17 in a part of the lower surface of the semiconductor integrated circuit chip 11. The solder bump section 16 of the semiconductor integrated circuit device 10 is electrically connected to an electrode (not shown) formed in the circuit board 2. The under fill material 1 is charged in a gap between the circuit board 2 and the epoxy resin section 13, the Cu post section 15, and the solder bump section 16 which are formed below the semiconductor integrated circuit chip 11.

In the peel strength simulating apparatus 100_1 of the embodiment, the parameter specifying section 100_12 specifies the changeable parameters whose numerical values can be changed among the plural kinds of the parameters stored in the storage section 100_11, the parameter specifying section 100_12 specifies the change priorities when the plural kinds of the parameters are specified, and the peel strength of the location where the PI section 12 is formed between the semiconductor integrated circuit chip 11 and the epoxy resin section 13 is repeatedly simulated until the peel strength exceeding the predetermined threshold value is obtained, while the simulating section 100_13 changes the numerical values of the specified parameters according to the specified priorities. Therefore, at the time when the semiconductor integrated circuit device 10 is designed, the size, the material, the production condition, the usage condition, and the like of each constituent element of the semiconductor integrated circuit device 10 are considered in order to sufficiently enhance the peel strength between semiconductor integrated circuit chip 11 and the epoxy resin section 13 bonded to each other. Accordingly, the highly reliable semiconductor integrated circuit device 10 in which the peel strength is sufficiently enhanced between the semiconductor integrated circuit chip 11 and epoxy resin section 13 bonded to each other while the cost increase is suppressed can be provided.

Figure 10:
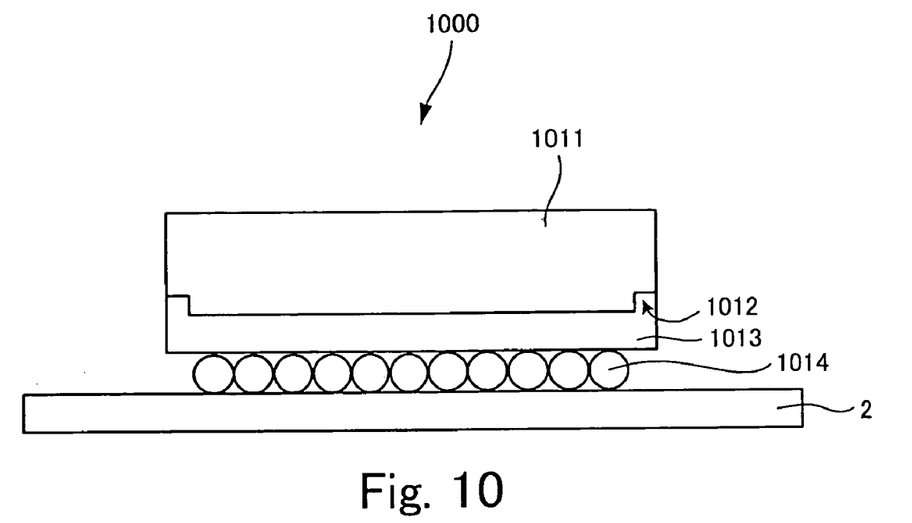
FIG. 10 shows a state in which a semiconductor integrated circuit device which is of a comparative example is mounted on the circuit board.

FIG. 10 shows a state in which a semiconductor integrated circuit device which is of a comparative example is mounted on the circuit board.

Referring to FIG. 10, a semiconductor integrated circuit device 1000 as a comparative example includes a semiconductor integrated circuit chip 1011, an epoxy resin section 1013, and a solder bump section 1014. A U-shaped groove 1012 is made in the semiconductor integrated circuit chip 1011. The epoxy resin section 1013 seals the lower portion of the semiconductor integrated circuit chip 1011. The solder bump section 1014 is electrically connected to a circuit board 2. In the semiconductor integrated circuit device 1000, the structure, the material, the production condition, the usage condition, and the like of the semiconductor integrated circuit device 1000 are not sufficiently considered from the design stage of the semiconductor integrated circuit device 1000. Therefore, when the smaller size of the U-shaped groove 1012 is made in the lower surface of the semiconductor integrated circuit chip 1011, the semiconductor integrated circuit device 1000 has the problem that the peel is easily generated at the boundary between the semiconductor integrated circuit chip 1011 and the epoxy resin section 1013.

Figure 11:
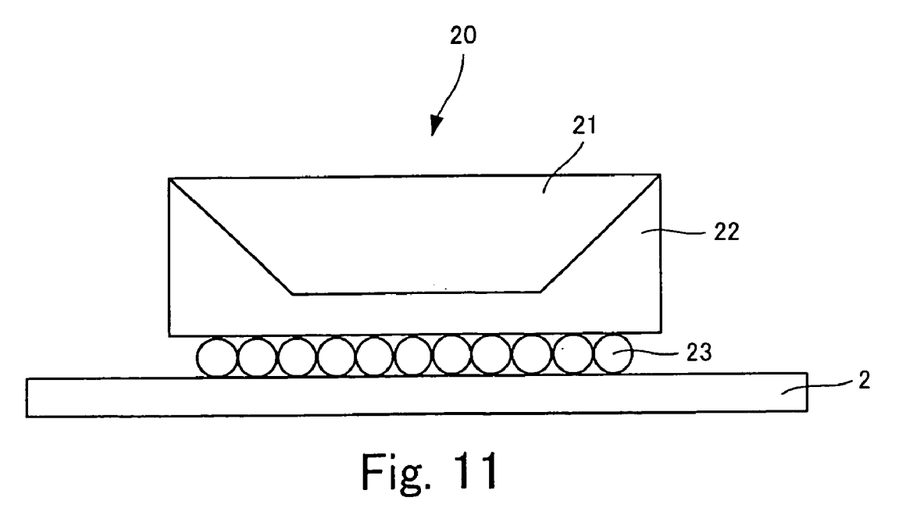
FIG. 11 shows a state in which a semiconductor integrated circuit device different from the semiconductor integrated circuit device shown in FIG. 9 is mounted on the circuit board.

FIG. 11 shows a state in which a semiconductor integrated circuit device different from the semiconductor integrated circuit device shown in FIG. 9 is mounted on the circuit board.

A semiconductor integrated circuit device 20 shown in FIG. 11 includes a semiconductor integrated circuit chip 21, an epoxy resin section 22, and a solder bump section 23. The semiconductor integrated circuit chip 21 has a shape formed by a predetermined dicing angle. The epoxy resin section 22 seals the lower portion of the semiconductor integrated circuit chip 21. The solder bump section 23 is electrically connected to a circuit board 2. In the semiconductor integrated circuit device 20, the various conditions including the dicing angle of the semiconductor integrated circuit chip 21 are sufficiently considered from the design stage of the semiconductor integrated circuit device 20. Therefore, the peel generated at the boundary between the semiconductor integrated circuit chip 21 and the sealing resin 22 can be prevented.

What is claimed is:

1. A peel strength simulating apparatus which simulates peel strength between a semiconductor integrated circuit chip and a resin package bonded to each other, the peel strength simulating apparatus comprising:

a storage section which stores a parameter table where plural types of parameters are each associated with a changeable numerical range of a parameter or a group of numerical values of a parameter in the parameter table;

a parameter specifying section which specifies, before simulation starts, a changeable parameter whose numerical value is changeable from the plural types of parameters in the parameter table stored in the storage section, the parameter specifying section specifying change priorities when specifying plural types of changeable parameters; and a simulating section which automatically repeats simulation of the peel strength until the peel strength exceeding a predetermined threshold value is obtained while automatically changing, without waiting for an operation by an operator, the numerical values of the changeable parameters specified by the parameter specifying section according to the priorities specified by the parameter specifying section.

2. A peel strength simulating apparatus according to claim 1, wherein the parameter table stored in the storage section includes at least a numerical range of a changeable size and a physical property of a changeable material.

3. A peel strength simulating program storage medium which stores a peel strength simulating program that causes, when executed in an information processing apparatus, the information processing apparatus to operate as a peel strength simulating apparatus that simulates peel strength between a semiconductor integrated circuit chip and a resin package bonded to each other, the peel strength simulating apparatus comprising:
- a storage section which stores a parameter table where plural types of parameters are each associated with a changeable numerical range of a parameter or a group of numerical values of a parameter in the parameter table;
- a parameter specifying section which specifies, before simulation starts, a changeable parameter whose numerical value is changeable from the plural types of parameters in the parameter table stored in the storage section, the parameter specifying section specifying change priorities when specifying plural types of changeable parameters; and
- a simulating section which automatically repeats simulation of the peel strength until the peel strength exceeding a predetermined threshold value is obtained while automatically changing, without waiting for an operation by an operator, the numerical values of the changeable parameters specified by the parameter specifying section according to the priorities specified by the parameter specifying section.

4. A peel strength simulating method of simulating peel strength between a semiconductor integrated circuit chip and a resin package bonded to each other, the peel strength simulating method comprising:
- preparing a parameter table where plural types of parameters are each associated with a changeable numerical range of a parameter or a group of numerical values of a parameter in the parameter table;
- specifying, before starting simulation, a changeable parameter whose numerical value is changeable from the plural types of parameters in the parameter table stored in the storage section and specifying change priorities when specifying plural types of changeable parameters; and
- automatically repeating simulation of the peel strength until the peel strength exceeding a predetermined threshold value is obtained while automatically changing, without waiting for an operation by an operator, the numerical values of the changeable parameters specified by the parameter specifying section according to the priorities specified by the parameter specifying section.

* * * * *